United States Patent
Fisher et al.

(10) Patent No.: US 6,631,314 B2
(45) Date of Patent: Oct. 7, 2003

(54) PROPELLANT UTILIZATION SYSTEM

(75) Inventors: Jay Andrew Fisher, Denver, CO (US); Joseph Patrick Wurst, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 32 days.

(21) Appl. No.: 10/052,126

(22) Filed: Jan. 17, 2002

(65) Prior Publication Data

US 2003/0019977 A1 Jan. 30, 2003

Related U.S. Application Data

(60) Provisional application No. 60/292,768, filed on May 22, 2001.

(51) Int. Cl.[7] ............................. B64G 1/42; F03H 1/00
(52) U.S. Cl. ............................ 701/13; 701/3; 244/172; 60/228; 60/250
(58) Field of Search ................... 701/13, 3; 244/158 R, 244/172, 169; 60/201, 204, 228, 233, 234, 250, 257

(56) References Cited

U.S. PATENT DOCUMENTS

| | | | | |
|---|---|---|---|---|
| 4,840,025 A | * | 6/1989 | Coffinberry | 60/219 |
| 5,263,666 A | * | 11/1993 | Hubert et al. | 244/172 |
| 5,651,515 A | * | 7/1997 | Saccoccia et al. | 244/158 R |
| 5,823,478 A | | 10/1998 | Dunn | 244/172 |
| 5,961,074 A | | 10/1999 | Dunn | 244/135 |
| 6,283,412 B1 | | 9/2001 | Mango | 244/135 |

OTHER PUBLICATIONS

Pending U.S. patent application Ser. No. 10/057,224, entitled "Cryogenic Propellant Depletion System for a Launch Vehicle" by Zeender et al, filed on Jan. 25, 2002 and assigned to Lockheed Martin Corporation.

* cited by examiner

Primary Examiner—Tan Q. Nguyen
(74) Attorney, Agent, or Firm—Marsh Fischmann & Breyfogle LLP

(57) ABSTRACT

A propellant utilization system for a space vehicle having at least a first thrust source and a second thrust source. The propellant utilization system utilizes a common set of algorithms to generate mixture ratios for each thrust source as each thrust source becomes active. The propellant utilization system includes a processing system comprising sequencer logic, propellant logic, and mixture ratio logic. The sequencer logic determines when a thrust source is active, e.g. one of the first and second thrust sources, and provides flight parameters for the active thrust source to the propellant logic and the mixture ratio logic. The propellant logic processes information from propellant sources connected to the active thrust source, using the flight parameters for that thrust source, to determine an amount of remaining propellant in each source. The mixture ratio logic generates a mixture ratio for the active thrust source, using the flight parameters for that thrust source and information on the remaining amount of propellant in the in each source connected to the active thrust source.

45 Claims, 6 Drawing Sheets

PROPELLANT UTILIZATION SYSTEM

CROSS REFERENCE TO RELATED APPLICATIONS

This application claims priority from U.S. Provisional Application Serial No. 60/292,768, that was filed on May 22, 2001, that is titled "Propellant Utilization System," and the entire disclosure of which is incorporated by reference in its entirety herein.

FIELD OF THE INVENTION

The invention is related to the field of space vehicles for use in launching a payload from a stationary ground-based position into orbit, and specifically to a propellant utilization system for controlling depletion of multiple propellant sources connected to multiple thrust sources on the space vehicle.

BACKGROUND OF THE INVENTION

Rocket powered space vehicles used in space missions can generally be categorized into launch vehicles and payloads. Launch vehicles provide the primary thrust for launching and delivering a payload from the earth's surface into orbit. Launch vehicles generally include one or more rocket engines arranged to fire at different times, or stages, as the launch vehicle travels from the earth's surface into orbit. The different stages are fired sequentially and typically include at least a first stage or booster stage and a second stage or upper stage. The booster stage is designed to launch and deliver the payload a pre-determined distance above the earth before exhaustion. Upon exhaustion of the booster stage, the upper stage is fired to deliver the payload the remainder of the distance into a desired orbit.

The launch vehicle rockets may use either a solid propellant or a liquid propellant and typically include at least one propellant tank, a combustion chamber, and a nozzle for accelerating/discharging the combustion product. Liquid propellant rockets are known in the art as bi-propellant rocket systems because a liquid fuel and liquid oxidizer are stored in separate propellant tanks and brought into contact in the combustion chamber to provide the thrust. Such bi-propellant rocket systems have gained favor for many applications because of performance, economics, safety, throttling capabilities and flexible mission design.

Propellant utilization systems are used on a "per stage basis" (i.e., each stage has its own independent propellant utilization system) to maximize the efficiency of its corresponding bi-propellant rocket system by controlling the mixture ratio at which the liquid fuel and oxidizer are combined. These systems calculate mixture ratios according to desired exhaustion characteristics for the liquid fuel and oxidizer propellants. For example, in some cases, it is desirable to simultaneously exhaust both the liquid fuel and the oxidizer propellants to minimize the amount of one propellant remaining at the actual depletion of the other propellant. In other cases, however, it is desirable to exhaust one of the propellants before the other one of the propellants.

Propellant utilization systems include sensors located in the liquid fuel and oxidizer propellant tanks as well as software to compute a remaining amount of propellant in each tank and an engine mixture ratio for the engine controls that achieves the desired exhaustion rate. Unfortunately, however, bi-propellant rocket engines have proprietary operational characteristics that require the use of different flight parameters to calculate remaining propellant, mixture ratios, and exhaustion rates. As a result, each rocket engine on a space vehicle is equipped with its own proprietary propellant utilization system that is programmed with the flight parameters for that engine. Additionally, the propellant utilization for one engine cannot be used on another engine.

SUMMARY OF THE INVENTION

The present invention generally relates to rocket powered space vehicles that have bi-propellant thrust sources or rocket engines. The propellant utilization system described herein, however, may be appropriate for use on any bi-propellant engine that includes mixture ratio control capability. In the context of the present invention, the term "bi-propellant" is defined as having at least two sources of a fuel or fuel component, including without limitation a liquid fuel, an oxidizer fuel, and/or multiple liquid, solid, or gaseous fuels.

In view of the foregoing, a primary object of the present invention is to provide a single propellant utilization system that accommodates one or more bi-propellant thrust sources or rocket engines. Another object of the present invention is to provide a propellant utilization system that is easily adaptable for operation with any bi-propellant thrust source. Yet another object of the present invention is to provide a propellant utilization system for space vehicles equipped with multiple rocket engines that sequences with the firing of the different engines to generate and provide mixture ratios for the active engine.

One or more of the above-noted objectives, as well as additional advantages, are provided by the present invention, which includes a propellant utilization system for a space vehicle having at least a first thrust source and a second thrust source. The present propellant utilization system utilizes a common set of algorithms to generate mixture ratios for the individual thrust sources as the thrust source becomes active during a flight.

According to a first aspect of the invention, a propellant utilization system is provided that includes a processing system comprising sequencer logic, propellant logic, and mixture ratio logic. The sequencer logic determines when a thrust source is active, e.g. one of the first and second thrust sources, and provides flight parameters for the active thrust source to the propellant logic and the mixture ratio logic. The propellant logic processes information from a pair of propellant sources connected to the active thrust source, using the flight parameters for that thrust source, to determine an amount of propellant in each source. The mixture ratio logic generates a mixture ratio for the active thrust source using the flight parameters for that thrust source and information on the amount of propellant in the pair of propellant sources connected to the active thrust source.

Various refinements exist of the features noted in relation to the subject first aspect of the present invention. Further features may also be incorporated in the subject first aspect of the present invention as well. These refinements and additional features may exist individually or in any combination. For example, the above-noted propellants for each thrust source are typically a liquid fuel propellant and a liquid oxidizer propellant, and the above-noted thrust sources are each typically rocket engines. The mixture ratios for the active thrust source, e.g. rocket engine, may result in the substantial simultaneous depletion of the liquid fuel and oxidizer propellants for the active thrust source. Alternatively, the mixture ratios for the active thrust source may result in the depletion of one of the liquid fuel or oxidizer propellants before the other one of the liquid fuel or oxidizer propellants.

The information provided to the propellant logic from the propellant sources connected to the active thrust source in the case of the first aspect could be any information that is usable to determine an amount of propellant in the propellant sources. In one embodiment, the information from the propellant sources is the pressure information of the liquid fuel propellant in the liquid fuel propellant source and the pressure information of the oxidizer propellant in the oxidizer propellant source. The propellant logic uses the pressure information to generate a mass of propellant in each of the propellant sources. In some embodiments of the present invention, the propellant logic may also use the mass information to generate a difference error representative of the difference between the amount of liquid fuel propellant and the amount of oxidizer propellant relative to a depletion rate of the liquid fuel and oxidizer propellant. In another embodiment of the present invention, the mixture ratio logic may use the mass information to generate the difference error between the amount of liquid fuel propellant and the amount of oxidizer propellant.

According to a second aspect of the present invention, a software product for a propellant utilization system is provided. The software product includes sequencer logic instructions, propellant logic instructions, and mixture ratio logic instructions. The sequencer logic instructions are operational when executed on a processor to determine when one of multiple thrust sources on a space vehicle is active, e.g. one of the first and second thrust sources, and to provide flight parameters for the active thrust source to the propellant logic instructions and the mixture ratio logic instructions. The propellant logic instructions are operational when executed on the processor to receive and process information from a pair of propellant sources, e.g. a liquid fuel propellant source and oxidizer propellant source, connected to the active thrust source, e.g. rocket engine. The propellant logic instructions process the information using the flight parameters for the active thrust source to determine an amount of propellant in each source. The mixture ratio logic instructions are operational when executed on the processor to generate mixture ratios for the active thrust source. The mixture ratio logic instructions use the flight parameters for active thrust source and the information on the amount of propellant in the propellant sources connected to the active thrust source to generate the mixture ratios.

Various refinements exist of the features noted in relation to the subject second aspect of the present invention. Further features may also be incorporated in the subject second aspect of the present invention as well. These refinements and additional features may exist individually or in any combination. The sequencer logic instructions, propellant logic instructions, and mixture ratio logic instructions can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry.

A third aspect of the present invention is a method for generating mixture ratios for a space vehicle having at least a first thrust source and a second thrust source, e.g. a first rocket engine and a second rocket engine. The method includes the step of determining an active one of the first thrust source and the second thrust source, and thereafter providing first flight parameters for the active thrust source. Each of the first thrust source and the second thrust source include a pair of propellant sources, e.g. a liquid fuel and oxidizer propellant source. In this regard, the method of the third aspect includes computing, using the first flight parameters, a first propellant amount in a first propellant source and a second propellant amount in a second propellant source that are each connected to the active thrust source. The method also includes the step of computing, using the first flight parameters and the first and second propellant amounts, a mixture ratio for the active thrust.

Various refinements exist of the features noted in relation to the subject third aspect of the present invention. Further features may also be incorporated in the subject third aspect of the present invention as well. These refinements and additional features may exist individually or in any combination. In this regard, the method of the third aspect could also include determining that the other one of the first thrust source and the second thrust source is the active thrust source and providing second flight parameters for the other one of the first and second thrust sources. The method may then further include the step of computing, using the second flight parameters, a third propellant amount in a third propellant source and a fourth propellant amount in a fourth propellant source that are each connected to the currently active thrust source. The method according to the third aspect may also include computing, using the second flight parameters and the third and fourth propellant amounts, a mixture ratio for the currently active thrust source.

The determination of the active thrust in accordance with the third aspect may be accomplished by sequencer logic that includes sequencer logic software instructions executable on the processing system of the present propellant utilization system. Furthermore, the computing of the propellant amount in the propellant sources connected to the active thrust source may be accomplished by propellant logic that includes propellant logic instructions that are executable on the processing system of the present propellant utilization system. Finally, the computing of the mixture ratios for the active thrust source may be accomplished by mixture ratio logic that includes mixture ratio logic instructions that are executable on the processing system of the present propellant utilization system.

DETAILED DESCRIPTION

Figure 1:
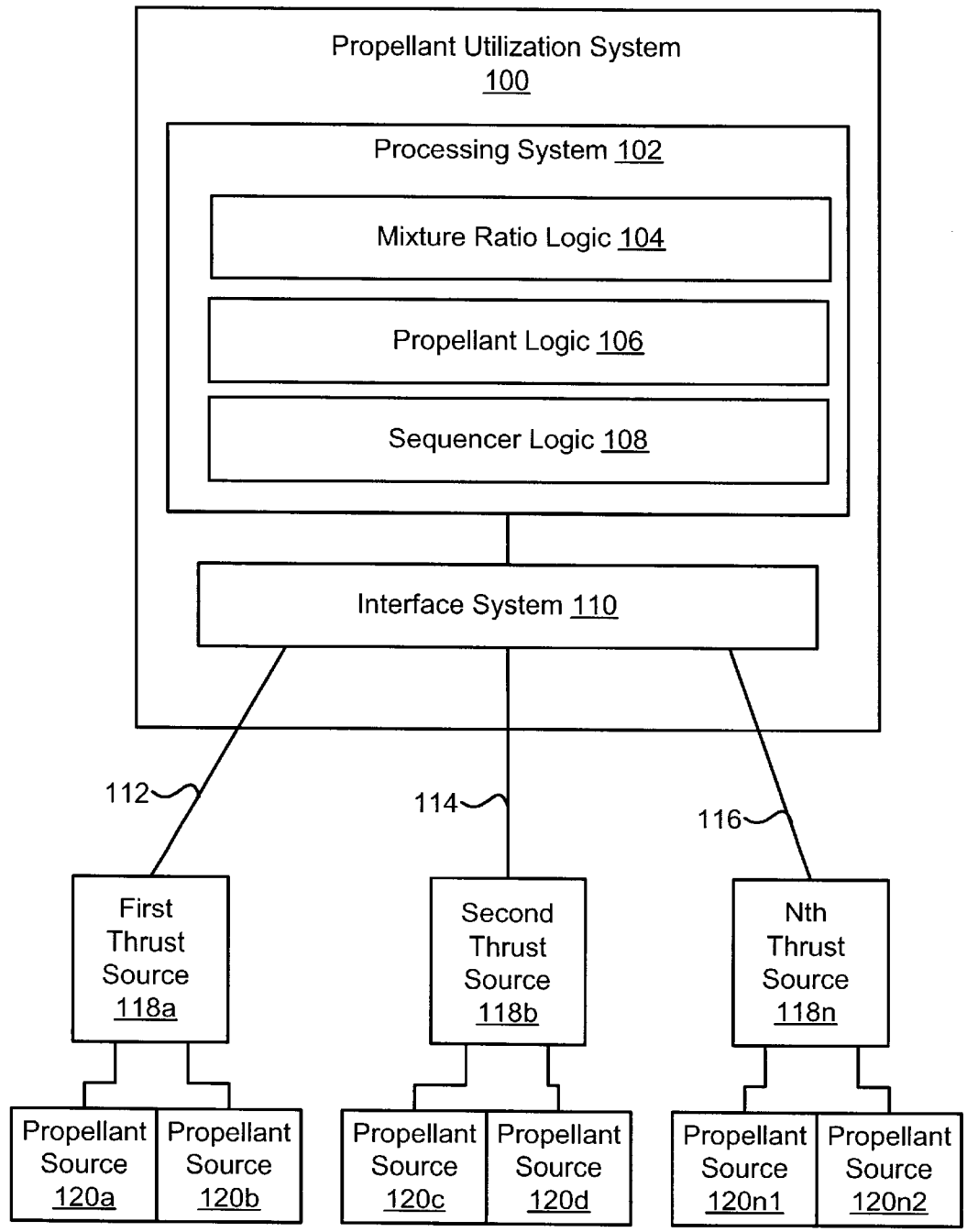
FIG. 1 illustrates one embodiment of a propellant utilization system for multiple thrust sources.

Reference will now be made to the accompanying drawings, which at least assist in illustrating the various pertinent features of the present invention. FIG. 1 illustrates one embodiment of propellant utilization 100. Propellant utilization system 100 includes a processing system 102 coupled to an interface system 110. The processing system 102 includes mixture ratio logic 104, propellant logic 106, and sequencer logic 108.

The propellant utilization system ("PUS") 100, and specifically the interface system 110, is electrically connected to one or more thrust sources on a space vehicle (not shown). For example, the PUS 100 could be connected to a first thrust source 118a, a second thrust source 118b, and Nth thrust source 118n as exemplified by the connections 112–116, respectively on FIG. 1. Advantageously, the PUS 100 is designed to provide mixture ratio control for numerous thrust sources 118, with the specific number of thrust sources 118 typically being determined by the design of the space vehicle, e.g. number of thrust sources 118 on the space vehicle.

The processing system 102 could be one or more processors that control operation of the mixture ratio logic 104, the propellant logic 106, and the sequencer logic 108. Those skilled in the art will appreciate that the processing system 100 could be a stand-alone device or be included as part of other devices such as a flight computer for a space vehicle. Furthermore, the processing system 102 could also be a processing platform including one or more individual processors programmed to operate in accordance with one or more principles of the present invention.

The propellant logic 106 could be any logic or circuitry that operates under the control of the processing system 102 to receive information from individual propellant sources 120 connected to the thrust sources 118 of the space vehicle, e.g. the first thrust source 118a, second thrust source 118b, and Nth thrust source 118n. The propellant logic 106 processes the information from the corresponding propellant sources 120 to determine an amount of propellant in the sources 120. The information provided by the individual propellant sources 120 could include any information usable to determine the propellant amount in the individual propellant sources 120. For example, the information could include without limitation, propellant pressure information, propellant volume, and propellant mass provided by sensors located in the individual propellant sources 120.

The mixture ratio logic 104 could be any logic or circuitry that operates under the control of the processing system 102 to receive information from the propellant logic 106 on the amount of propellant in the propellant sources 120. The mixture ratio logic 104 processes the information to determine a mixture ratio for an active one of the thrust sources 118, e.g. the first thrust source 118a, second thrust source 118b, and Nth thrust source 118n. The mixture ratio generated by the mixture ratio logic 104 is used by the active thrust source 118 to achieve a desired propellant exhaustion rate, e.g. substantial simultaneous exhaustion of propellants or exhaustion of a first propellant from one corresponding propellant source 120 before exhaustion of a second propellant from another corresponding propellant source 120.

The sequencer logic 108 could be any logic or circuitry that operates under the control of the processing system 102 to determine which one of multiple thrust sources 118, e.g. the first thrust source 118a, second thrust source 118b, and Nth thrust source 118n, for a space vehicle is currently active or being used. Responsive to determining the active one of the thrust sources 118, the sequencer logic 108 provides the appropriate flight parameters for the active thrust source 118 to the propellant logic 106 and the mixture ratio logic 104. The flight parameters are used by the propellant logic 106 to compute the amount of propellant in the propellant sources 120 connected to the active thrust source 118. Similarly, some or all of the flight parameters are also used by the mixture ratio logic 104 to compute the mixture ratio for the active thrust source 118 according to desired exhaustion characteristics.

The interface system 110 could be any device or group of devices that receives the information from the propellant sources 120 for the active thrust source 118 for the propellant logic 106. The interface system 110 could also provide the generated mixture ratios to the active thrust source(s) 118 for the mixture ratio logic 104. The interface system 110 could also exchange information between the PUS 100 and a flight computer for the space vehicle.

Figure 2:
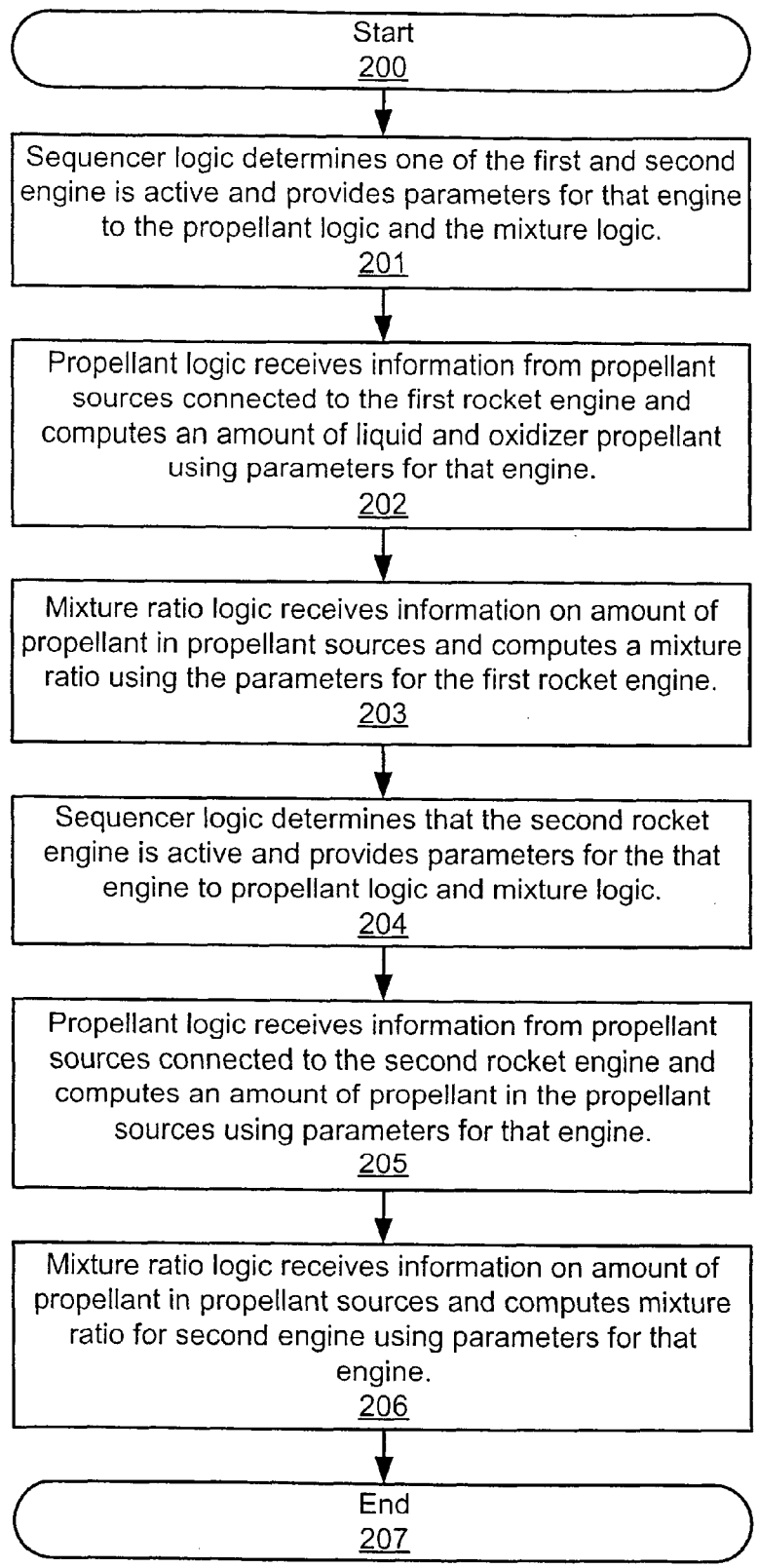
FIG. 2 is a flow chart illustrating one embodiment of a protocol for providing a propellant utilization function for multiple thrust sources.

FIG. 2 is a flow chart illustrating one embodiment of a propellant utilization protocol that may be used by of the PUS 100. This protocol will be described in the context of a multi-stage launch vehicle equipped with a first thrust source and second thrust source sequentially fired at the exhaustion of the first thrust source to deliver a payload into orbit. The first thrust source is a bi-propellant rocket engine connected to a first liquid fuel propellant source and a first oxidizer propellant source. The second thrust source is also a bi-propellant rocket engine connected to a second liquid fuel propellant source and a second oxidizer source.

On FIG. 2, the operation begins at step 200. At step 201, the sequencer logic determines an active one of the first rocket engine and the second rocket engine, in this case the first rocket engine. It will be appreciated that the determining step could be accomplished using different methods, but what is important is that the sequencer logic 108 acquires knowledge of which rocket engine is currently active in order to provide the appropriate flight parameters for that engine to the propellant logic 106 and the mixture ratio logic 104. Thus, in one embodiment, a flight computer could provide an input to the sequencer logic 108 indicating the active rocket engine. In another embodiment, an input could be received from the active rocket engine or a sensor located proximate to or on the rocket engine.

Responsive to determining the first rocket engine is the active thrust source, the sequencer logic 108 provides the flight parameters for the first rocket engine to the propellant logic 106 and the mixture ratio logic 104. Alternatively, the sequencer logic 108 could provide access to the flight parameters, which are then accessed during propellant amount and mixture computations by the propellant logic 106 and mixture ratio logic 104.

At step 202, the propellant logic 106 receives information from the first liquid fuel propellant source and the first oxidizer propellant source connected to the first rocket engine. For example, the propellant logic 106 could receive information on the pressure of the liquid fuel propellant and the pressure of the oxidizer propellant. The propellant logic 106 uses the information from the liquid fuel and oxidizer propellant sources in combination with the flight parameters for the first rocket engine to compute an amount of liquid fuel propellant and oxidizer propellant, and provides the propellant amount information to the mixture ratio logic 104.

At step 203, the mixture ratio logic 104 receives the propellant amount information and computes a mixture ratio using the flight parameters for the first rocket engine. The mixture ratio logic 104 provides the mixture ratio to the rocket engine controls, which in turn use the mixture ratio to achieve a desired exhaustion rate for the liquid fuel propellant and the oxidizer propellant.

At step 204, the sequencer logic 108 determines that the other one of the rocket engines, e.g. the second rocket engine, is now the active thrust source, and provides flight parameters for the second rocket engine to the propellant logic 106 and the mixture ratio logic 104. Again, the sequencer logic 108 could simply provide access to the flight parameters for use by the propellant logic 106 and the mixture ratio logic 104.

At step 205, the propellant logic 106 receives information, e.g. pressure information, from the second liquid fuel and oxidizer propellant sources connected to the second rocket engine. The propellant logic 106 uses the information in combination with the flight parameters for the second rocket engine to compute an amount of liquid fuel propellant and oxidizer propellant in the second liquid fuel and oxidizer propellant sources respectively. The propellant logic 106 provides the propellant amount information to the mixture ratio logic 104.

At step 206, the mixture ratio logic 104 receives the propellant amount information, computes a mixture ratio using the flight parameters for the second rocket engine, and provides the mixture ratio to the second rocket engine controls. The second rocket engine controls in turn use the mixture ratio to achieve a desired exhaustion rate for the liquid fuel propellant and the oxidizer propellant. At step 207, the propellant utilization protocol ends.

Figure 3:
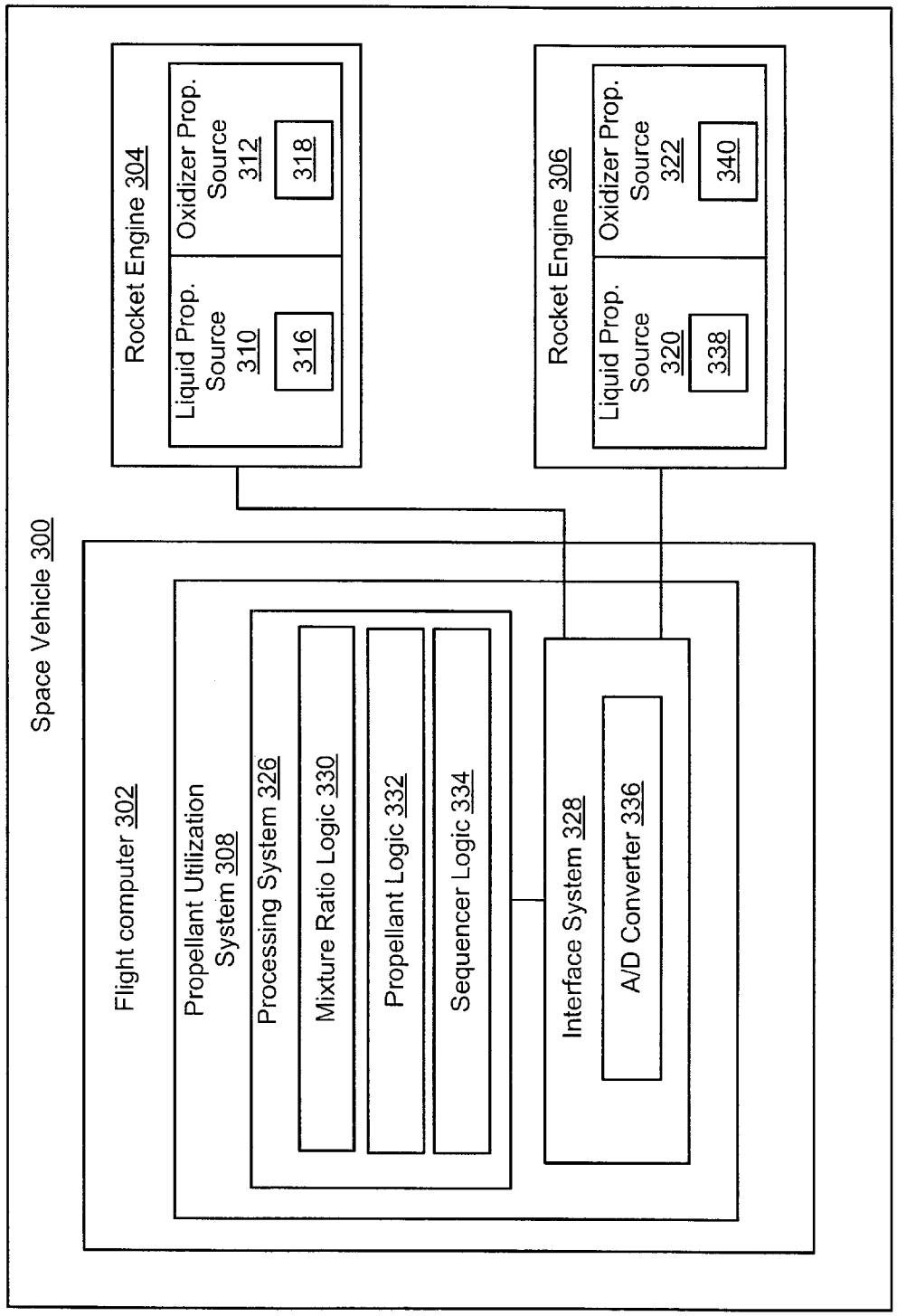
FIG. 3 is one embodiment of a system architecture that includes a propellant utilization system for multiple thrust sources.

FIG. 3 illustrates one embodiment of a system architecture that includes a propellant utilization system for multiple thrust sources. Those skilled in the art will appreciate how the examples described below could be combined with the above-described embodiments to form numerous additional embodiments in accordance with one or more principles of the present invention.

FIG. 3 depicts a space vehicle 300. The space vehicle 300 includes a flight computer 302, a first rocket engine 304, and a second rocket engine 306. The flight computer includes a PUS 308 connected to the rocket engines 304 and 306. The PUS 308 includes a processing system 326 coupled to an interface system 328. The processing system 326 includes mixture ratio logic 330, propellant logic 332, and sequencer logic 334. The interface 328 includes an analog to digital ("A/D") converter 336.

The rocket engine 304 could be a conventional bi-propellant rocket engine that includes a liquid fuel propellant source 310 and an oxidizer propellant source 312. The liquid fuel propellant source 310 and oxidizer propellant source 312 each include a pressure transducer, 316 and 318, respectively. The rocket engine 306 could also be a conventional bi-propellant rocket engine that includes a liquid fuel propellant source 320 and an oxidizer propellant source 322. The liquid fuel propellant source 320 and the oxidizer propellant source 322 also include pressure transducers, 338 and 340, respectively.

The pressure transducers, 316 and 318, measure the amount of head pressure in the liquid fuel propellant source 310 and the oxidizer propellant source 312 respectively. When the engine 304 is active, the output of the pressure transducers, 316 and 318, is provided to the interface 328 under the control of the flight computer 302. Similarly, the pressure transducers, 338 and 340, measure the amount of head pressure in the liquid fuel propellant source 320 and the oxidizer source 322 respectively. When the engine 306 is active, the output of the pressure transducers, 338 and 340, is provided to the interface 328 under the control of the flight computer 302. Specifically, the head pressures from transducers 316, 318, 338, and 340 are provided to the A/D converter 336. The A/D converter 336 converts incoming analog signals from the transducers 316, 318, 338, and 340 to digital signals. The output of the A/D converter 336 is provided to the propellant logic 332.

Figure 4:
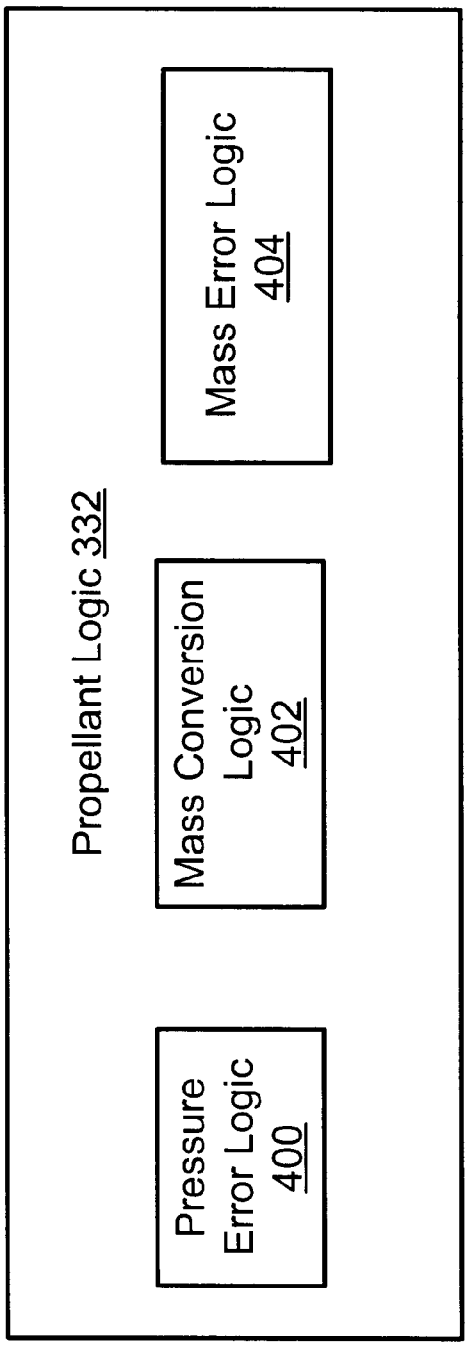
FIG. 4 illustrates one embodiment of the propellant logic used by the propellant utilization system of FIG. 3.

FIG. 4 illustrates one embodiment of the propellant logic 332 that may be used by the PUS 308 of FIG. 3. For purpose of discussion, the present example assumes that the engine 304 is the currently active engine on the space vehicle 300. The operation, however, is identical when the engine 306 is the currently active engine, with the exception of the flight parameters used in the computations described below.

The propellant logic 332 includes at least pressure error logic 400, mass conversion logic 402, and mass error logic 404. The pressure error logic 400 receives incoming pressure signals from transducers, 316 and 318 via the A/D converter 336. The pressure error logic 400 is operational to perform an initial check of the incoming signals for obvious errors. For example, the pressure error logic 400 may detect a significant change in pressure compared to a previous pressure received from the same transducer, e.g. 316, which indicates an error in the provided pressure signal. In another example, the pressure error logic 400 may detect the lack of a signal from one of the transducers, e.g. 318, indicating an error in the system has occurred. In another example, the pressure error logic 400 may compare incoming pressure signals with an upper and lower threshold, wherein an error condition exists if an incoming measured pressure is outside of the threshold limits. Those skilled in the art will appreciate numerous other checks that could be made on the incoming pressure signals from transducers, 316 and 318, as a matter of design choice. If an error condition is detected, the pressure error logic 400 provides a control signal to the mixture ratio logic 330 indicating the error condition. The mixture ratio logic 330, in turn, utilizes a nominal mixture ratio for the active engine, in this case engine 304.

The output of the pressure error logic 400, e.g. pressure signals from transducers, 316 and 318, are provided to the mass conversion logic 402. The mass conversion logic 402 processes the incoming pressure signals to compensate for physical aspects of the system such as pressure losses in supply lines etc. for the currently active engine 304. The mass conversion logic 402 also converts the head pressures into a quantity of mass by dividing each pressure by a measured acceleration factor to obtain a normalized unit-g pressure. The mass conversion logic 402 further converts the normalized unit-g pressures into a mass using a height volume lookup table. The output of the mass conversion logic 402, e.g. mass of liquid fuel propellant in source 310 and mass of oxidizer propellant in source 312, is provided to the mass error logic 402.

The mass error logic 402 performs a second error check using the computed liquid fuel and oxidizer masses. For example, mass error logic 402 may check for mass quantities exceeding defined thresholds for a current portion of the flight, e.g. a mass quantity that indicates more propellant than is possible given initial propellant amounts and distance traveled. In another example, the mass error logic 402 may detect the lack of a mass quantity altogether for one of the liquid fuel and oxidizer sources 310 and 312. Those skilled in the art will appreciate numerous other checks that could be made on the incoming mass measurements as a matter of design choice. If an error condition is found, the mass error logic 402 provides a control signal to the mixture logic 330 and the nominal mixture ratio for the active engine, in this case engine 304, is utilized. The output of the mass error logic 402 is provided to the mixture ratio logic 330.

Figure 5:
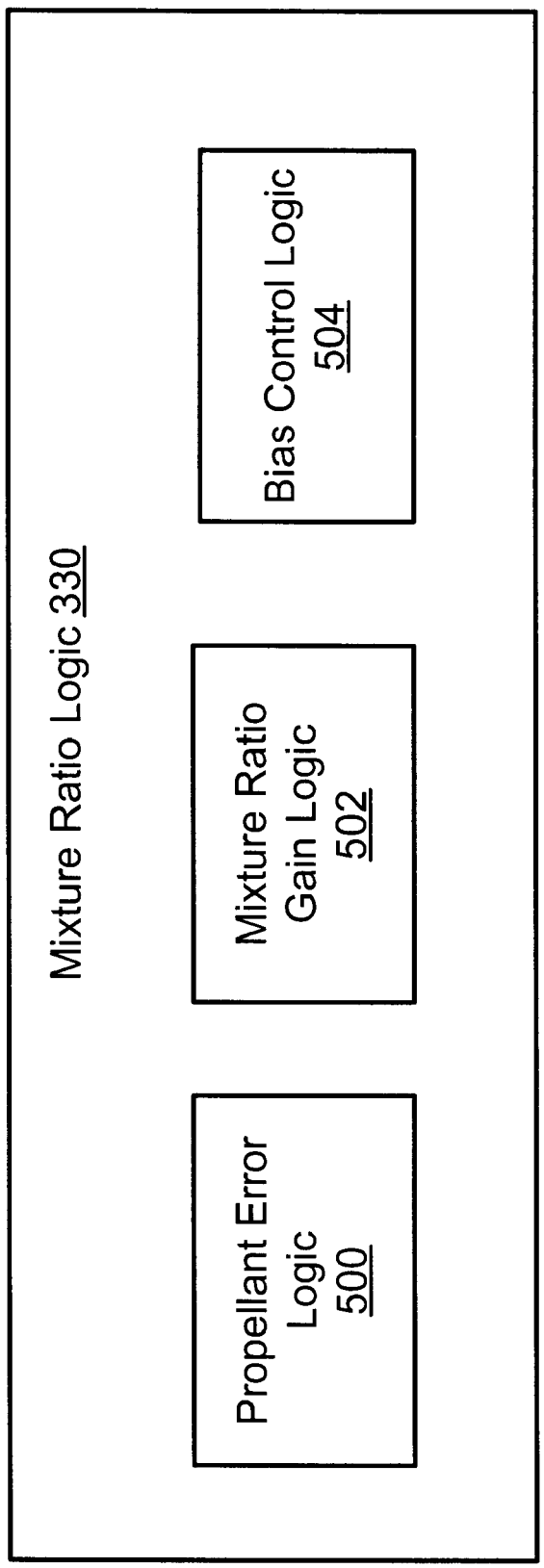
FIG. 5 illustrates one embodiment of the mixture ratio logic used by the propellant utilization system of FIG. 3.

FIG. 5 depicts one embodiment of the mixture ratio logic 330 that may be used by the PUS 308 of FIG. 3. The mixture ratio logic 330 includes propellant error logic 500, mixture ratio gain logic 502, and bias control logic 504. The propellant error logic 500 normalizes the measured propellant mass in each of the liquid fuel source 310 and the oxidizer source 312 in terms of a depletion rate of one of the propellants, e.g. the oxidizer, relative to the liquid fuel propellant, and computes a difference error. The difference error represents the excess of one of the liquid fuel and oxidizer propellants relative to the other one of the liquid fuel and oxidizer propellant. In the case where substantial simultaneous exhaustion of the liquid fuel and oxidizer propellants is desired, the difference error is provided to the mixture ratio gain logic 502. The mixture ratio gain logic 502 processes the difference error to compute a mixture ratio for the engine 304 that compensates for the difference in liquid fuel and oxidizer propellants and provides the mixture ratio to the mixture controls for the engine 304.

If on the other hand, it is desired to exhaust one of the liquid fuel and oxidizer propellants before the other one of the propellants. The difference error is provided to the bias control logic 504. The bias control logic 504 compensates for situations where it is desired to exhaust one of the liquid fuel and oxidizer propellants before the other one of the liquid fuel and oxidizer propellants. In this regard, the bias control logic 504, computes the difference error relative to the desired exhaustion rate of the liquid fuel and oxidizer propellants. The output of the bias control logic 504 is provided to the mixture ratio gain control 502 for computation of a mixture ratio for the engine 304 that achieves the desired exhaustion rate, e.g. exhaustion of one of the liquid fuel and oxidizer propellants before the other one.

Figure 6:
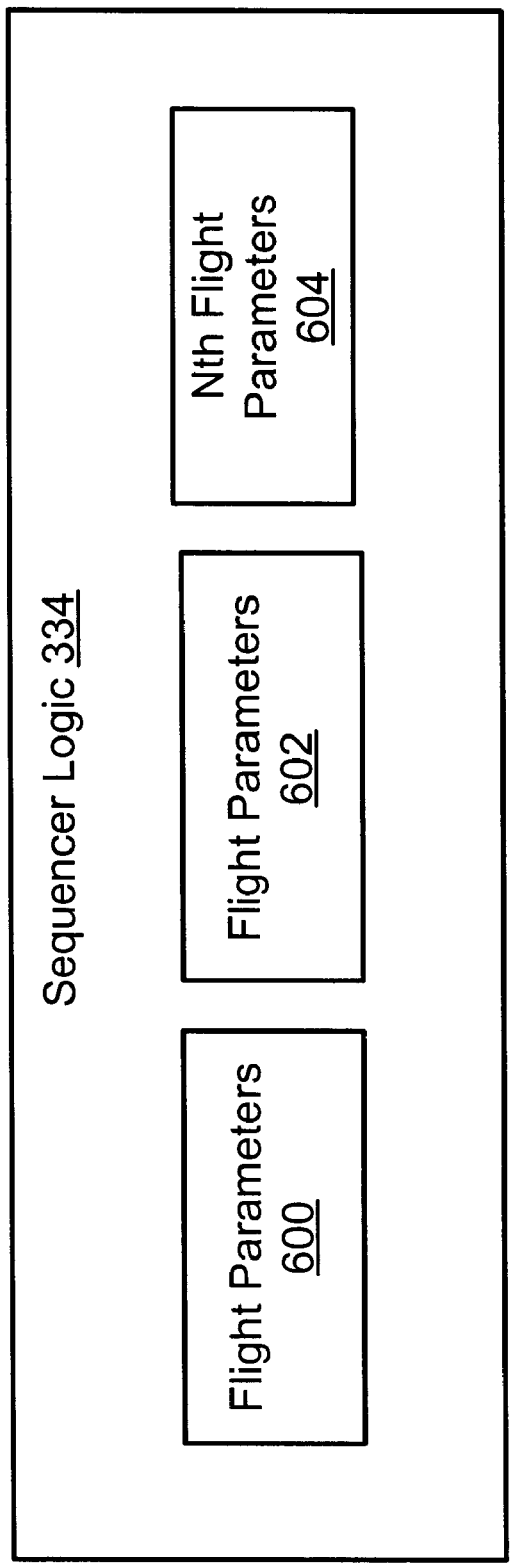
FIG. 6 illustrates one embodiment of the sequencer logic used by the propellant utilization system of FIG. 3.

FIG. 6 illustrates one embodiment of the sequencer logic 334 that may be used by the PUS 308 of FIG. 3. The sequencer logic 334 includes flight parameters 600, for rocket engine 304, and flight parameters 602, for rocket engine 306. Nth flight parameters 604 are also depicted on FIG. 6 to illustrate that the PUS 308 is operational to accommodate space vehicles having more than two thrust sources.

The sequencer logic 334 is operational to determine which one of engines, 304 and 306, is the currently active engine and provide the appropriate one of the flight parameters, 600 and 602, to the propellant logic 332 and the mixture ratio logic 330. The sequencer logic 334 could operate under the direction of the flight computer 302, e.g. the flight computer 302 indicates the active engine to the sequencer logic 334 and the sequencer logic 334 provides the appropriate flight parameters, 600 and 602. Alternatively, the sequencer logic 334 could operate under the direction of the flight computer 302 to provide access to the flight parameters, 600 and 602, according to the active one of the engines 304 or 306. In still yet another embodiment, the sequencer logic 334 could receive information from one of the engines, 304 and 306, that indicates the engine is active. Regardless of the method used, what is important is that the sequencer logic 334 has knowledge of the active one of the engines, 304 and 306.

In another embodiment, the sequencer logic 334 could also be operational to control the delivery of the pressure signals from the transducers 316, 318, 338, and 340. In this case, the sequencer logic 334 sequences between transducers, 316 and 318, and transducers, 338 and 340, to provide the appropriate pressure signals to the propellant logic 332 as a function of the active one of the engines 304 and 306.

The flight parameters, 600 and 602, are typically engine specific flight parameters that correspond to the stage of flight of the space vehicle 300. The flight parameters, 600 and 602, account for the different conditions present when the engines, 304 and 306, are fired, e.g. varying atmospheric and flight conditions such as jettisoning of fairings and exhausted stages of the space vehicle 300. Thus, different values and/or parameters are used for the engine 304, e.g. a booster engine, than are utilized for engine 306, e.g. upper stage flight engine.

The following is an exemplary list of some of the parameters that could be used for the engines 304 and 306. Those skilled in the art will appreciate numerous variations as well as additions to the following parameters that would or at least could be used as a matter of design choice.

parameters for transducer signal error checking for engine 304 and parameters for transducer signal error checking for engine 306;

coefficients for compensation of physical aspects of engine 304 and coefficients for compensation of physical aspects of engine 306;

coefficients for acceleration measurement during flight using engine 304 and coefficients for acceleration measurement during flight using engine 306;

pressure versus mass table for liquid fuel and oxidizer propellants used in engine 304 and pressure versus mass table for liquid fuel and oxidizer propellants used in engine 306;

coefficients for mass error checking for engine 304 and coefficients for mass error checking for engine 306;

nominal mixture ratio for engine 304 and nominal mixture ratio for engine 306;

failure mixture ratio for engine 304 and failure mixture ratio for engine 306;

conversion factors for difference error to mixture ratio for engine 304 and conversion factors for difference error to mixture ratio for engine 306;

upper and lower limit of mixture ratio for engine 304 and upper and lower limit of mixture ratio for engine 306;

coefficients for difference error bias calculation for engine 304 and coefficients for difference error bias calculation for engine 306.

system error polynomial for engine 304 liquid fuel and oxidizer, system error polynomial for engine 306 liquid fuel and oxidizer.

It should be noted that the above-described algorithm is a continuous process operating while at least one of the engines 304 and 306 is active. In that regard, propellant amounts are calculated along with mixture ratios to continually adjust the consumption rate of the active engine, e.g. 304, to achieve the desired exhaustion rates.

The above-described elements can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

Those skilled in the art will appreciate variations of the above-described embodiments that fall within the scope of the invention. As a result, the invention is not limited to the specific examples and illustrations discussed above, but only by the following claims and their equivalents.

We claim:

1. A propellant utilization system for a space vehicle having at least a first thrust source and a second thrust source, the propellant utilization system comprising:
   a processing system including sequencer logic to determine an active one of the first and second thrust source and provide first flight parameters for the active one of the first and second thrust source;
   propellant logic to process, using the first flight parameters, first information from a first and second propellant source connected to the active one of the first and second thrust source to determine a first propellant amount in the first propellant source and a second propellant amount in the second propellant source; and
   mixture ratio logic to generate a first mixture ratio for the active one of the first and second thrust source based on the first propellant amount, the second propellant amount, and the first flight parameters.

2. The system of claim 1 wherein the sequencer logic is configured to determine when the other one of the first and second thrust source becomes the active thrust source, and provide second flight parameters for the other one of the first and second thrust source.

3. The system of claim 2 wherein the propellant logic is configured to process, using the second flight parameters, second information from third and fourth propellant sources connected to the other one of the first and second thrust source to determine a third propellant amount in the third propellant source and a fourth propellant amount in the fourth propellant source.

4. The system of claim 3 wherein the mixture logic is configured to generate a second mixture ratio for the other one of the first and second thrust source based on the third propellant amount, the fourth propellant amount, and the second flight parameters.

5. The system of claim 4 wherein the first mixture ratio substantially simultaneously depletes the first and second propellant sources and the second mixture ratio substantially simultaneously depletes the third and fourth propellant sources.

6. The system of claim 4 wherein the first mixture ratio depletes one of the first and second propellant sources before the other one of the first and second propellant sources, and the second mixture ratio depletes one of the third and fourth propellant sources before the other one of the third and fourth propellant sources.

7. The system of claim 4 wherein the first information from the first and second propellant sources comprises:
   a first propellant pressure information and a second propellant pressure information, and wherein the second information from the third and fourth propellant sources comprises a third propellant pressure information and a fourth propellant pressure information.

8. The system of claim 7 wherein the propellant logic is configured to process the first information to generate a first propellant mass and a second propellant mass and process the second information to generate a third propellant mass and a fourth propellant mass.

9. The system of claim 8 wherein the mixture ratio logic is configured to process the first propellant mass and the second propellant mass to generate a first difference error representative of a difference in the first propellant amount and the second propellant amount relative to a depletion rate of the first propellant and the second propellant.

10. The system of claim 9 wherein the mixture ratio logic is configured to process the third propellant mass and the fourth propellant mass to generate a second difference error representative of a difference in the third propellant amount and the fourth propellant amount relative to a depletion rate of the third propellant and the fourth propellant.

11. The system of claim 10 wherein the mixture ratio logic is configured to use the first difference error to calculate the first mixture ratio and the second difference error to calculate the second mixture ratio.

12. The system of claim 1 wherein the first thrust source is a first rocket engine and the second thrust source is a second rocket engine.

13. The system of claim 12 wherein the first and second rocket engines are bi-propellant rocket engines.

14. The system of claim 3 wherein the first and third propellant source are liquid fuel propellant sources.

15. The system of claim 3 wherein the second and fourth propellant sources are oxidizer propellant sources.

16. The system of claim 1 wherein the space vehicle is a launch vehicle.

17. A software product for a propellant utilization system in a space vehicle having at least a first thrust source and a second thrust source, the software product comprising:
   sequencer logic instructions operational when executed on a processor to direct the processor to determine an active one of the first and second thrust source and provide first flight parameters for the active one of the first and second thrust source;
   propellant logic instructions operational when executed on the processor to direct the processor to process, using the first flight parameters, first information from a first and second propellant source connected to the active one of the first and second thrust source, to determine a first propellant amount and a second propellant amount;
   mixture ratio logic instructions operational when executed on the processor to direct the processor to generate a first mixture ratio for the active one of the first and the second thrust source based on the first propellant amount, the second propellant amount, and the first flight parameters; and
   a storage medium operational to store the sequencer logic instructions, the propellant logic instructions, and the mixture ratio logic instructions.

18. The product of claim 17 wherein the sequencer logic instructions are operational to direct the processor to determine when the other one of the first and second thrust source becomes the active thrust source, and provide second flight parameters for the other one of the first and second thrust source.

19. The product of claim 18 wherein the propellant logic instructions are operational to direct the processor to process, using the second flight parameters, second information from third and fourth propellant sources connected to the other one of the first and second thrust source to determine a third propellant amount and a fourth propellant amount.

20. The product of claim 19 wherein the mixture ratio logic instructions are operational to direct the processor to generate a second mixture ratio for the other one of the first and second thrust source based on the third propellant amount, the fourth propellant amount, and the second flight parameters.

21. The product of claim 20 wherein the first mixture ratio substantially simultaneously depletes the first and second propellant sources and the second mixture ratio substantially simultaneously depletes the third and fourth propellant sources.

22. The product of claim 20 wherein the first mixture ratio depletes one of the first and second propellant sources before the other one of the first and second propellant sources, and the second mixture ratio depletes one of the third and fourth propellant sources before the other one of the third and fourth propellant sources.

23. The product of claim 20 wherein the first information from the first and second propellant sources comprises:
a first propellant pressure information and a second propellant pressure information, and wherein the second information from the third and fourth propellant sources comprises a third propellant pressure information and a fourth propellant pressure information.

24. The product of claim 23 wherein the propellant logic instructions are operational to direct the processor to process the first information to generate a first propellant mass and a second propellant mass and process the second information to generate a third propellant mass and a fourth propellant mass.

25. The product of claim 24 wherein the mixture ratio logic instructions are operational to direct the processor to process the first propellant mass and the second propellant mass to generate a first difference error representative of a difference in the first propellant amount and the second propellant amount relative to a depletion rate of the first propellant and the second propellant.

26. The product of claim 25 wherein the mixture ratio logic instructions are operational to direct the processor to process the third propellant mass and the fourth propellant mass to generate a second difference error representative of a difference in the third propellant amount and the fourth propellant amount relative to a depletion rate of the third propellant and the fourth propellant.

27. The product of claim 26 wherein the mixture ratio logic instructions are operational to direct the processor to use first difference error to calculate the first mixture ratio and the second difference error to calculate the second mixture ratio.

28. The product of claim 17 wherein the first thrust source is a first rocket engine and the second thrust source is a second rocket engine.

29. The product of claim 28 wherein the first and second rocket engines are bi-propellant rocket engines.

30. The product of claim 17 wherein the first and third propellant source are liquid fuel propellant sources.

31. The product of claim 19 wherein the second and fourth propellant sources are oxidizer fuel propellant sources.

32. The product of claim 19 wherein the space vehicle is a launch vehicle.

33. A method for generating a mixture ratio for a space vehicle having at least a first thrust source and a second thrust source, the method comprising:
determining an active thrust source, wherein the active thrust source is an active one of the first thrust source and the second thrust source;
providing first flight parameters for the active thrust source;
computing, using the first flight parameters, a first propellant amount in a first propellant source and a second propellant amount in a second propellant source, wherein the first and second propellant source are connected to the active thrust source; and
computing, using the first flight parameters, a first mixture ratio for the active thrust source.

34. The method of claim 33 the method comprising:
determining that the other one of the first thrust source and the second thrust source is the active thrust source;
providing second flight parameters for the other one of the first thrust source and the second thrust source;
computing, using the second flight parameters, a third propellant amount in a third propellant source and a fourth propellant amount in a fourth propellant source, wherein the third and fourth propellant sources are connected to the other one of the first and second thrust source; and
computing, using the second flight parameters, a second mixture ratio for the other one of the first and second thrust source.

35. The method of claim 33 wherein the step of computing the amount of propellant in the first propellant source and the second propellant source comprises:
receiving first and second propellant pressure information from the first and second propellant source; and
converting the first and second propellant pressure information into first and second propellant mass information, using the first flight parameters.

36. The method of claim 35 wherein the step of computing the amount of propellant in the third propellant source and the fourth propellant source comprises:
receiving third and fourth propellant pressure information from the third and fourth propellant source; and
converting the third and fourth propellant pressure information into third and fourth propellant mass information, using the second flight parameters.

37. The method of claim 34 wherein the first mixture ratio substantially simultaneously depletes the first and second propellant sources and the second mixture ratio substantially simultaneously depletes the third and fourth propellant sources.

38. The method of claim 34 wherein the first mixture ratio depletes one of the first and second propellant sources before the other one of the first and second propellant sources, and the second mixture ratio depletes one of the third and fourth propellant sources before the other one of the third and fourth propellant sources.

39. The method of claim 36 comprising:
computing, using the first flight parameters, a first difference error using the first and second propellant mass information representative of a difference in the first propellant amount and the second propellant amount relative to a depletion rate of the first propellant and the second propellant.

40. The method of claim 39 comprising:
computing, using the second flight parameters, a second difference error using the third and fourth propellant mass information representative of a difference in the third propellant amount and the fourth propellant amount relative to a depletion rate of the third propellant and the fourth propellant.

41. The method of claim 40 comprising:
computing the first mixture ratio using the first difference error; and
computing the second mixture ratio using the second difference error.

42. The method of claim 33 wherein the first thrust source is a first rocket engine and the second thrust source is a second rocket engine.

43. The method of claim 42 wherein the first and second rocket engines are bi-propellant rocket engines.

44. The method of claim 34 wherein the first and third propellant source are liquid fuel propellant sources.

45. The method of claim 34 wherein the second and fourth propellant sources are oxidizer propellant sources.

* * * * *